Patented Oct. 20, 1925.

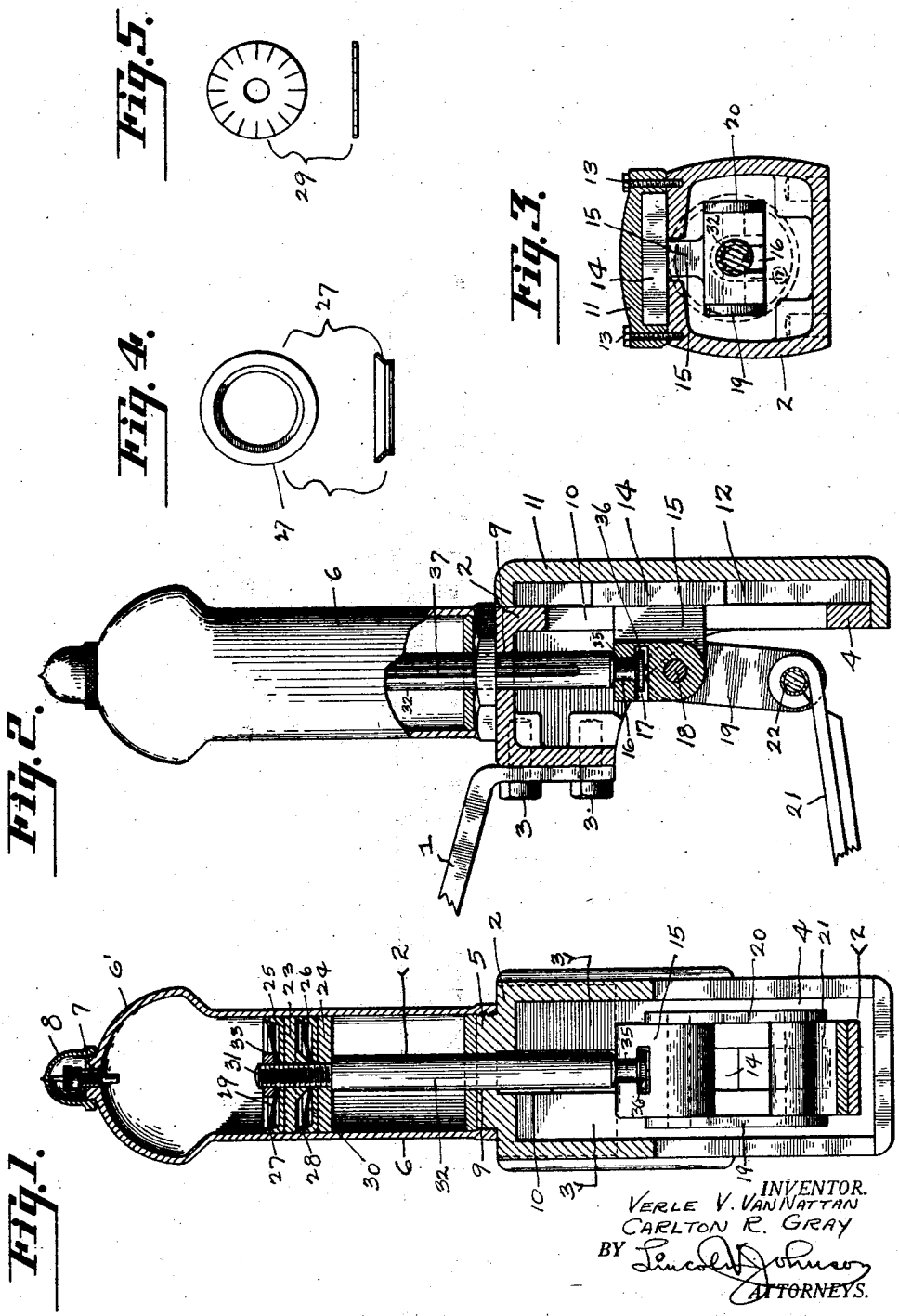

1,557,905

UNITED STATES PATENT OFFICE.

VERLE V. VAN NATTAN AND CARLTON R. GRAY, OF SAN FRANCISCO, CALIFORNIA.

AIR SPRING.

Application filed July 11, 1923. Serial No. 650,852.

*To all whom it may concern:*

Be it known that we, VERLE V. VAN NATTAN and CARLTON R. GRAY, citizens of the United States, and residents of the city and county of San Francisco, State of California, have made a new and useful invention—to wit, Improvements in Air Springs; and we do hereby declare the following to be a full, clear, concise, and exact description of the same.

This invention relates particularly to a hydro-pneumatic cushioning device more particularly known as an air spring, adaptable to use on vehicles, such as automobiles, wagons, trucks, buses and the like.

An object of the invention is to provide an air spring adapted to be used as a cushioning element between relatively movable and immovable bodies for the purpose of obtaining resilient support and otherwise functioning in the same manner as, and possessing all of the conventional features of, shock absorbers and steel springs.

A further object of the invention is to provide an air spring so constructed as to avoid reference or similarity in operation and structure to conventional types of automobile springs formed of telescoping tubular members of which one member is secured to an automobile frame and the sliding member to the vehicle spring.

A still further object of the invention is to provide an air spring that will be superior in point of simplicity and inexpensiveness of construction, positiveness of operation, facility and convenience in use and general efficiency as contrasted with devices and mechanisms of a similar character. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a vertical section through an air spring constructed in accordance with my invention.

Fig. 2 is a side elevation of Fig. 1 partly broken away on the line 2—2.

Fig. 3 is a section taken through Fig. 1 on the line 3—3.

Fig. 4 is a plan and cross-sectional view of the flanged ring for spreading the cup leather on the piston.

Fig. 5 is a plan view and side elevation of the expander plate used in conjunction with the flanged ring.

Various types of hydro-pneumatic and air cushioning devices have been invented for achieving resilient effects between movable and immovable bodies, all of which usually employ, as essential parts of the construction, either internal compression pumps, pressure valves, telescoping cylinders, dash pots, coil springs, air pumps, or the like. The present invention, as well as that illustrated and described in our pending application bearing Ser. No. 459,603 and filed on April 8, 1921, differ from the conventional type of air spring in so far as the ingenious mechanisms, referred to, have been eliminated, and a device capable of functioning in substantially the same manner, with a materially reduced number of parts, has been produced.

In detail the construction illustrated in the drawings comprises the frame 1 of an automobile, or other equivalent stationary element. An air cushioning device consisting of a housing 2 is bolted to the stationary element 1 by the bolts 3 and has a guide frame 4 depending from the lower side of said housing. The upper face of the housing is provided with a circular projection 5 thereon, the outside of which is threaded to receive the internally threaded bottom of a cylinder 6. The end of the cylinder is closed at 6' and has an air valve 7 detachably mounted therein, and covered by a cap 8, for excluding dirt and dust from the said valve and for preventing pressure losses from said valve. Although I have shown and described the cylinder 6 as being provided with a closed end 6' formed integrally with the said cylinder 6, it would be clearly within the purview of this invention to detachably connect the closed end of the cylinder to the cylinder proper.

A bearing 9 is provided concentrically through the circular projection 5 and housing 2, which bearing is in axial registry with the axis of the cylinder 6. The axis of the cylinder is thus off-set relative to the slide path formed in the guideway 4. The guideway 4 consists of a depending plate, integral with the housing 2, and in which a slot 10 is cut parallel with the axis of the cylinder 6.

A cover 11, having a recess 12 therein, and closed at its upper and lower ends, is secured by the screws 13 over the outside face of the guideway 4 to the depending portion of the housing 2.

A slide member or block 14 is slidably confined to movement in a vertical direction in the recess 12 provided between the cover 11 and depending member 4. The slide shoe 14 has a central projection 15 thereon which extends through the slot 10 in the member 4. The projection 15 is slotted at 16 to register with a cavity 17 formed in said slide shoe extension. The extension 15 is drilled transversely to receive a shackle bolt 18, the opposite ends of which have the shackle plates 19 and 20 mounted thereon, and between which the leaf spring 21 is pivotally mounted on the pin 22.

A piston member is reciprocatingly mounted within the cylinder 6, consisting of a pair of circular plates 23 and 24 on the upper faces of which the cup leathers 25 and 26 respectively, are mounted. Annular flanged rings 27 and 28 are adapted to contact with the up-turned edges of the cup leathers 25 and 26 to force the edges outwardly into contact with the cylinder wall. Expander plates 29 and 30 are utilized to press against the flanged rings 27 and 28 and create the desired tensional contact on the cup leathers 25 and 26. The assembly of circular plates, cup leathers, flanged rings and expander plates, is securely mounted on the reduced threaded end 31 of a connecting rod 32, by means of a nut 33. The connecting rod 32 is adapted to move axially within the cylinder 6, being slidably confined in the bearing 9, provided through the upper face of the housing 2. The lower end of the connecting rod 32 is reduced at 35, adjacent the enlarged end 36 of said connecting rod, for the purpose of being detachably engaged with the slot 16 and cavity 17 formed in the extension 15 of the cylinder shoe 14. The connecting rod 32 is slotted at 37 on its exterior for substantially the full length thereof to provide a vent or bleeder port into the space between the underside of the piston and the upper face of the housing 2, and thus prevent the forming of a partial vacuum or any retarding suction effects in said space on the up-stroke of the cylinder piston.

The invention operates in the following manner. Air is passed through the valve 7 into the space provided between the upper face of the piston and the closed end of the cylinder, until a predetermined and desired pressure has been obtained. The pressure within the air chamber described would be such as would permit reciprocation of the piston either upwardly or downwardly. A small volume of lubricant would be placed within the cylinder on top of the piston for lubricating the same and for hermetically sealing against air pressure losses. Movement of the relatively movable leaf spring 21 would be transmitted through the shackle plate 19 and 20 to the slide shoe 14, which in turn would be moved vertically in the guide frame 4. Movement of the slide shoe 14 would be thus transmitted through the connecting rod 32 and piston against the air pressure contained in the upper end of the cylinder 6 and all shocks and similar disruptive effects absorbed. No air pressure is maintained between the underside of the piston and the upper face of the housing 2, but means is provided for partially exhausting air compressed in said space by the downward movement of the piston. The air of normal pressure which would be compressed in said lower space on the downward stroke of the piston would be vented to the atmosphere through the slot 37 and similarly atmospheric air would be permitted to pass through said slot into said space to fill the same whereby to allow the piston to move freely without any retarding effects which would be produced were the suction or partial vacuum in said space not compensated for. On the recoil, the air that is compressed by the underside of the piston effectively cushions any downward movement thereof somewhat similar to the cushioning effect obtained by the air pressure in the upper end of the cylinder.

Having thus described this invention, what I claim and desire to secure by Letters Patent is:

1. A cushioning device comprising a closed cylinder fixed to a vehicle frame and adapted to contain a pressure; a substantially closed guide frame depending from and connected to said cylinder; a piston slidably retained within said cylinder; a slide, slidably retained in said guide frame; a connecting rod extending through an end of said cylinder and pivotally connected at its opposite ends to said piston and slide; and a movable vehicle spring connected to said slide and adapted to move said interconnected slide and piston axially with respect to said cylinder and guide frame.

2. A cushioning device comprising a closed cylinder fixed to a vehicle frame and adapted to contain a pressure; a substantially closed guide frame depending from and offset relative to the axis of said cylinder; a piston slidably retained within said cylinder; a slide, having an end slidably guided in and movable in said guide frame on a slide path parallel with the axis of said cylinder; a connecting rod extending through an end of said cylinder and pivotally connected at its opposite ends to said piston and slide; and a vehicle spring connected to said slide and adapted to move the same.

3. A cushioning device comprising a closed cylinder fixed to a vehicle frame and adapted to contain a pressure; a substantially closed guide frame off-set relative to, depending from and independent of said cylinder; a piston slidably retained within said cylinder; a connecting rod secured to said piston and extending axially from said cylinder; a block, movable on a slide path parallel to the axis of said cylinder, in said guide frame and loosely connected to said rod; and a vehicle spring connected to said block and adapted to move the same.

4. A cushioning device comprising a closed cylinder fixed to a vehicle frame and having a piston slidably retained therein and adapted to contain a relatively constant pressure between one side of said piston and an end of said cylinder; a guide frame, off-set relative to and secured to said cylinder; a T shaped block, slidably mounted in said guide frame and movable on a slide path parallel with the axis of said cylinder, loosely connected to said piston; a vehicle spring adapted to be connected to said block to move the same against said pressure; and means for confining a variable pressure between the opposite sides of said piston and the opposite wall of said cylinder.

5. A cushioning device comprising a closed cylinder fixed to a vehicle frame and having a piston slidably retained therein and adapted to contain a relatively constant pressure between one side of said piston and an end of said cylinder; a connecting rod secured to said piston and extending from said cylinder; a guide frame secured to said cylinder and off-set substantially parallel with the axis of said cylinder; a T block slidably mounted in said guide, movable with respect to said cylinder and loosely connected to said rod; a vehicle spring adapted to be connected to said T block, to move the same against said pressure; and means for confining a variable pressure between the opposite side of said piston and the opposite wall of said cylinder.

6. A cushioning device comprising a relatively stationary closed cylinder adapted to be fixed to a vehicle frame; a separate T shaped guide frame on said cylinder; a piston slidably retained in said cylinder and adapted to confine a relatively constant pressure between one side thereof and an end of said cylinder; means for retaining a variable pressure between the other side of said piston and the end of said cylinder; a T shaped member slidably retained in said guide frame and having a projection thereon oscillatably connected with said piston and a relatively movable means on said vehicle secured to said T shaped member.

7. A cushioning device comprising a relatively stationary closed cylinder adapted to be fixed to a vehicle frame; a separate and substantially closed guide frame, including separate end guides, depending from said cylinder; a piston and rod slidably guided in said cylinder, said piston being adapted to confine a substantially constant pressure between one face of it and the cylinder end, and a variable pressure between its opposite face and the opposite end of the said cylinder; a block, slidably retained in said guide frame, having a slotted portion therein adapted to be detachably and loosely connected to the end of said piston rod and a relatively movable vehicle spring means secured to and adapted to move said block.

8. An air spring cushioning device such as described comprising a closed cylinder adapted to be pivotally mounted on a relatively stationary element; a separate and substantially closed guide frame depending from said cylinder and off-set relative to the axis of said cylinder; a piston and rod slidably guided in said cylinder, said piston being adapted to confine a substantially constant pressure between one face of it and the cylinder end and a variable pressure between its opposite face and the opposite end of the said cylinder; a block, slidably retained in said off-set guide frame, having a slotted portion therein adapted to be detachably and loosely connected with said piston rod and movable therewith and a relatively movable vehicle spring secured to said block.

In testimony whereof, we have hereunto set our hands at San Francisco, California, this 23rd day of June, 1923.

VERLE V. VAN NATTAN.
CARLTON R. GRAY.